United States Patent [19]

Deutsch et al.

[11] 4,452,003
[45] Jun. 5, 1984

[54] STORAGE CASE FOR FISHHOOKS

[76] Inventors: Wayne A. Deutsch, 1305 8th Ave., SE., Dyersville, Iowa 52040; James D. Schroeder, 1335 S. Grandview, Dubuque, Iowa 52001; Greg J. Hammel, Lost Canyon Park, Peosta, Iowa 52068

[21] Appl. No.: 345,614

[22] Filed: Feb. 3, 1982

[51] Int. Cl.³ ............................................. A01K 97/06
[52] U.S. Cl. ..................................... 43/25.2; 43/57.1; 206/315.11; 206/806
[58] Field of Search ................. 43/25, 25.2, 41, 57.1; 206/806, 205, 315.1, 315.8, 315.11; D3/38; D22/22, 23, 30, 99

[56] References Cited

U.S. PATENT DOCUMENTS

| D. 219,973 | 2/1971 | Sather | 43/57.1 X |
|---|---|---|---|
| 1,247,935 | 11/1917 | Conway | 43/41 |
| 3,839,811 | 10/1974 | Hopkins | 43/25.2 |
| 4,015,361 | 4/1977 | O'Reilly | 43/25.2 |

Primary Examiner—Nicholas P. Godici
Assistant Examiner—Charles L. Willis
Attorney, Agent, or Firm—Harvey B. Jacobson

[57] ABSTRACT

A container is provided including a pair of hingedly connected housing halves swingable between first side-by-side open positions wherein the housing halves open outwardly in the same direction and second closed positions wherein the housing halves are swung together and open into each other. One of the housing halves includes an interior anchor portion with which the hooked end of a line attached fishhook may be engaged and a remote closing edge of one of the housing halves has an outwardly opening recess formed therein for receiving the end of a fishing line attached to the fishhook, the outer end of the recess being closed by the other housing half when the housing halves are in their closed positions. Coacting latch structure is carried by the housing halves for securing the latter in their closed positions and the marginal portions of the housing halves remote from the aforementioned notch include anchor tabs having keyhole-shaped recesses formed in edge portions thereof for snap-anchoring engagement with an associated fishing rod line eye.

5 Claims, 6 Drawing Figures

U.S. Patent   Jun. 5, 1984   4,452,003
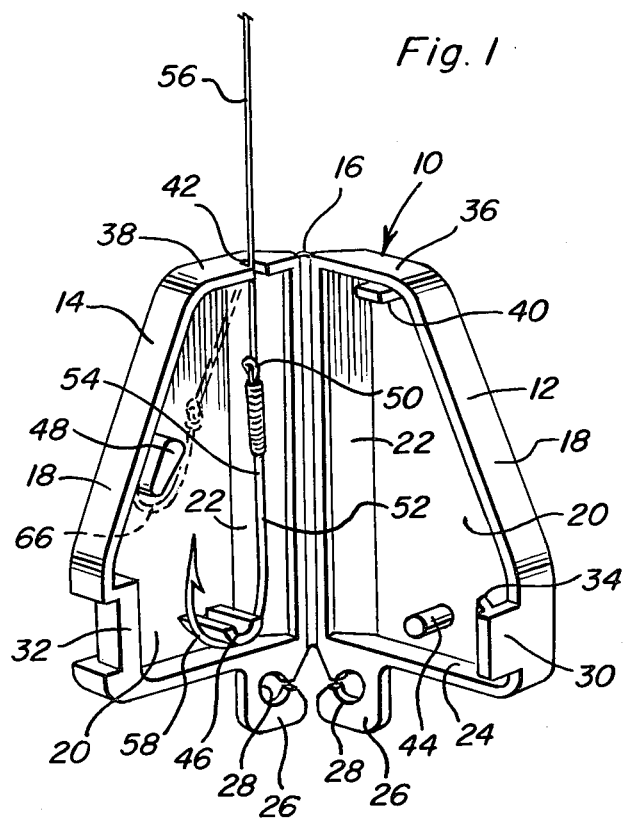
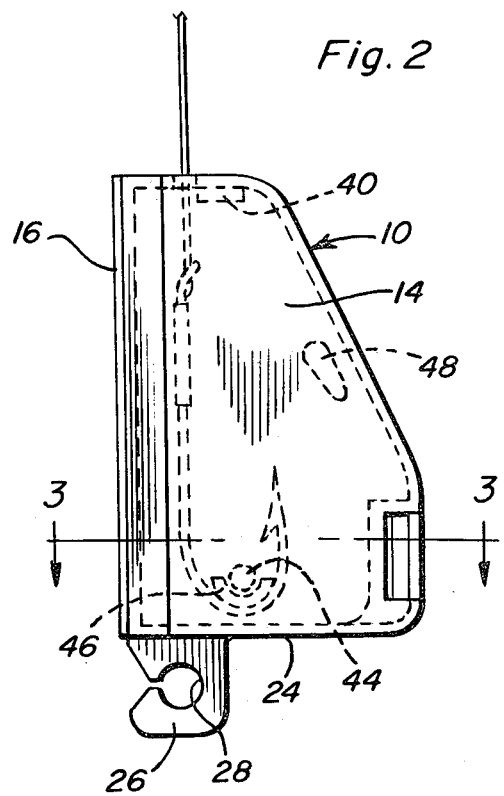
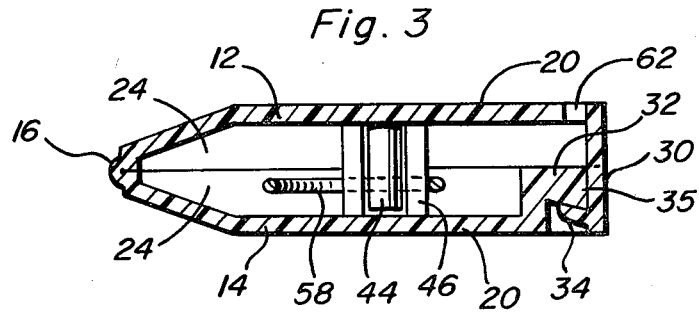
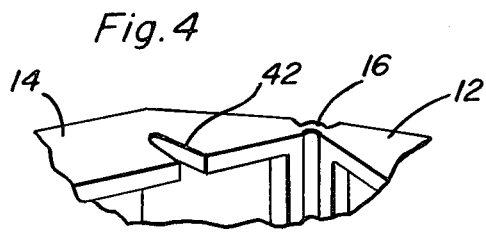
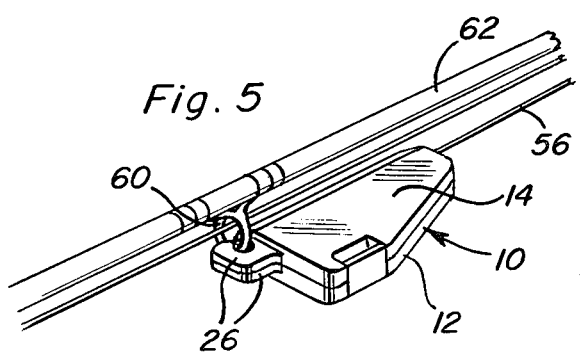
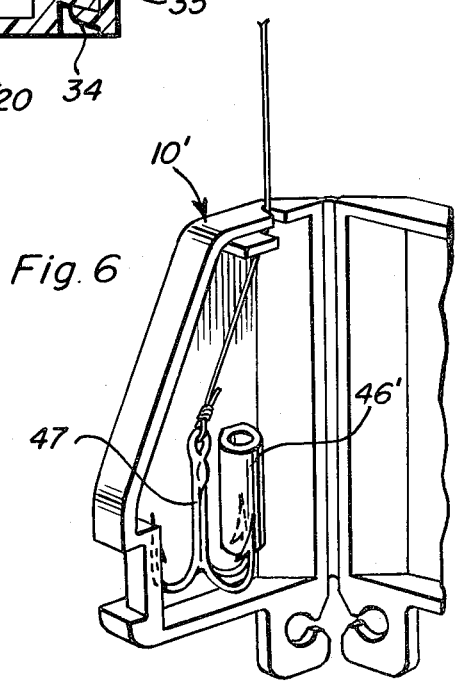

STORAGE CASE FOR FISHHOOKS

BACKGROUND OF THE INVENTION

Various forms of devices heretofore have been provided for receiving a fishing line mounted fishhook in a manner at least substantially enclosing the fishhook and including some structure for releasably supporting the devices from an associated fishing rod. However, some of these previously known devices have been expensive to produce, do not fully enclose the associated fishhook or require more than minimal effort to secure the devices to the associated fishing rod. Accordingly, a need exists for an improved form of storage device for a fishing line attached fishhook and with the storage device including structure whereby the device itself may be readily removably attached to an associated fishing rod.

Examples of previously known forms of fishhooks storage devices, including some of the general structural and operational features of the instant invention, are disclosed in U.S. Pat. Nos. 2,767,502, 3,425,150, 3,449,851, 3,484,979, 4,015,361 and 4,216,604.

BRIEF DESCRIPTION OF THE INVENTION

The storage case of the instant invention is constructed in a manner whereby a line attached fishhook may be readily removably stored therein with the adjacent end of the associated fishing line extending from the case and the case including structure whereby it may be readily removably supported from a line eye of an associated fishing rod.

The case includes latch structure for securing the case in a closed position and preventing the case being opened by small children. In addition, the case includes structure for releasably anchoring the case relative to an associated fishing rod eye in a manner such that even release of the latching mechanism which maintains the case in a closed position will not be effective to allow the case to be readily opened when the case is still releasably anchored relative to an associated fishing rod line eye.

The main object of this invention is to provide a storage case for fishing hooks which may be readily utilized to encase a fishing rod line attached fishhook.

Another object of this invention is to provide a case in accordance with the preceding object and constructed in a manner whereby the case may be readily releasably anchored relative to an associated fishing rod.

Still another important object of this invention is to provide a fishhook storage case in accordance with the preceding objects and provided with a latching mechanism whereby the case may be securely retained in a closed position against being opened by small children.

Another very important object of this invention is to provide a case in accordance with the immediately preceding object and including anchor structure therefor capable of releasably supporting the case from a fishing rod line eye and operative, while the case is releasably anchored relative to an associated fishing rod eye, to maintain the case in a closed position independent of release of the case closing latch.

A final object of this invention to be specifically enumerated herein is to provide a protective and storage case for fishing line attached fishhooks and with the case conforming to conventional forms of manufacture, being of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the case of the instant invention in a partially open position and with a fishing line attached fishhook disposed and anchored within one half of the case;

FIG. 2 is a side elevational view of the assemblage illustrated in FIG. 1 and with the case in a closed position enclosing the associated fishhook;

FIG. 3 is an enlarged horizontal sectional view taken substantially upon the plane indicated by the section line 3—3 of FIG. 2;

FIG. 4 is a fragmentary perspective view of the upper portion of the case illustrated in FIG. 1 illustrating the fishing line receiving notch or recess formed in one wall edge portion of the case;

FIG. 5 is a fragmentary perspective view illustrating the manner in which the case and the fishhook equipped end of the associated fishing line may be releasably anchored relative to a line eye of an associated fishing rod; and FIG. 6 is a fragmentary perspective view of a larger form of case, similar to that illustrated in FIG. 1, but illustrating the manner in which the larger case may be used to enclose a treble hook.

DETAILED DESCRIPTION OF THE INVENTION

Referring now more specifically to the drawings, the numeral 10 generally designates the storage case of the instant invention. The storage case 10 comprises a one-piece unit consisting of a pair of generally mirror image housing halves 12 and 14 constructed of plastic and interconnected by an integral "living hinge" 16. The housing halves 12 and 14 each include a peripheral wall 18 and an end wall 20. Peripheral wall portion 22 of the housing halves 12 and 14 are connected by the living hinge 16 and lower wall portions 24 of the housing halves include depending integral tabs 26. The tabs 26 each include a horizontally opening keyhole-shaped recess 28 and the recesses 28 open outwardly of corresponding vertical edge portions of the tabs. 26.

The housing halves 12 and 14 include corresponding marginal wall portions 30 and 32 spaced furthest from the living hinge 16 and the wall portion 30 includes a slightly inwardly angled latching tab 34, while the wall portion 32 includes a recess 35 in which to receive the tab 34, see FIG. 3, when the housing halves 12 and 14 are swung to the closed positions in order to latch the case 10 in the closed position.

The peripheral walls 18 include upper portions 36 and 38 on the housing halves 12 and 14 and the wall portion 36 includes an inwardly offset outwardly projecting tab 40, while the wall portion 38 includes a horizontally outwardly opening recess 42 formed therein. In addition, the end wall 20 of the housing half 12 includes a pin 44 and the end wall 20 of the housing half 14 includes a semi-cylindrical projection 46 in which the pin 44 is received when the housing halves 12 and 14 are swung to the closed position. Further, the end wall 20 of the housing half 14 further includes a horizontal projection 48 projecting outwardly therefrom toward the open side of the housing half 14.

In operation, the eye 50 of the shank 52 of a conventional fishhook 54 may be attached to one end of a fishing line 56 and the curved or hooked portion 58 of the fishhook 54 may be engaged with the projection 46 with the shank 52 projecting toward the recess and the fishing line 56 received within the recess. Then, the housing halves 12 and 14 may be closed and latched in the closed position by engagement of the tab or tongue 34 in the recess 35. Thereafter, the keyhole-shaped recesses 28 in the tabs 26 may be engaged with a line eye 60 of a fishing rod 62 with which the fishing line 56 is operatively associated and the line 56 may be tightened. In this manner, the hook 54 is supported from the line eye 60 of the rod 62 in a fully enclosed manner.

It will be noted from FIG. 3 of the drawings that the end wall 20 includes a slot 62 formed therein immediately adjacent the wall portion 30 and the slot 62 therefore isolates the extreme marginal portion of the end wall 20 from which the wall portion 30 is supported and enables the wall portion 30 to be slightly angulated sufficient to displace the tab 32 out of the recess 36 in order to allow the housing halves 12 and 14 to swing from their closed position illustrated in FIG. 3 of the drawings to the open position illustrated in FIG. 1.

Inasmuch as the tabs 26 are carried by the wall portions 24 remote from the wall portion 38 in which the recess 42 is formed and the recesses 28 open laterally of a straight path extending between the recess 42 and the recesses 28, once the case has been attached to the eye 60 in the manner illustrated in FIG. 5 of the drawings, it may not be accidentally dislodged therefrom as long as the line 56 is maintained taut.

The projection 48 may be used in lieu of projection 46 if the case 10 is to enclose a smaller fishhook 66 and the tab 40 is received immediately inwardly of the wall portion 38 when the housing halves 12 and 14 are swung to the closed position thereof and on the side of the recess 42 remote from the living hinge 16. In this manner, the fishing line 56 is prevented from moving past the tab 40 away from the living hinge 16 in the event the fishing line 56 should be dislodged from the recess 42.

With attention now invited more specifically to FIG. 6 of the drawings, there may be seen a modified form of container referred to in general by the reference numeral 10'. The container 10' is substantially identical to the container 10, except that a tubular anchor structure 46' is used in lieu of the projection 46 and may have one of the barbed portions of a treble hook 47 engaged therewith. Further, the width of the case 10' is greater than the width of the case 10 in order that the wider treble hook 47 may be received therein. Also, with the case 10', it is not necessary to include the projection 48 or the equivalent of the projection 44.

It is further pointed out that the latch comprising the recess 36 and the tab or tongue 32 is of such construction that a young child will be unable to open the case 10, as a safety measure. Further, when the case 10 is anchored relative to the eye 60 in the manner illustrated in FIG. 5 of the drawings, the engagement of the tabs 26 with the eye 60 prevents opening of the case 10 even if the latch is released. Accordingly, when the tabs 26 are engaged with the eye 60, the tabs 26 also serve as a latching mechanism to maintain the case 10 in a closed position.

When the case 10 is used to enclose a hook, the hook is fully enclosed against hooking some thing or person, protected against damage to the sharpened point or barb thereof, and contained in a sanitary condition against contamination of the hook by another substance and against contamination of some other object by the hook.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A container and anchor for a fish line attached, said container defining an open-sided recess in which to receive a line attached fishhook, anchor means in said recess adapted to have the hooked portion of a fishhook removably engaged therewith through the open side of said recess, means removably closing the open side of said recess and releasably latchable in position closing said open side, said container includng a wall portion thereof defining one marginal portion of said recess and an exposed edge facing in the direction in which said recess opens, said marginal portion having a notch therein opening outwardly through said edge for receiving a fishing line attached to said hook, said housing including an exterior anchor portion thereon on a side of said container remote from said notch for releasable anchoring to a fishing rod line eye, said container including a pair of open-sided housing halves hingedly connected together, one of said housing halves defining said means removably closing the open side of said recess, said exterior anchor portion including a pair of tabs carried by said housing halves and registered with each other when said housing halves are swung to the closed position, said tabs being carried by marginal portions of said housing halves remote from said notch and having keyhole-shaped recesses formed therein opening outwardly through corresponding marginal edges of said tabs in directions extending transverse to a straight path extending between said notch and said anchor means.

2. The container of claim 1 wherein said anchor means includes a projection carried by the portion of said container defining the inner end of said recess and projecting toward the open side of said recess.

3. The container of claim 1 wherein said anchor means comprises a sleeve carried by the portion of said container defining the inner end of said recess and generally longitudinally aligned with said notch, the end of said sleeve remote from said notch being adapted to have the hooked portion of a fishhook engaged therewith.

4. A container and anchor for a fish line attached hook, said container defining a pair of elongated side-by-side generally mirror image housing halves joined together along adjacent longitudinal marginal edges for swinging between open positions opening in substantially the same direction and closed positions opening into each other and with each housing half comprising a closure for the other housing half, anchor means carried within one end of one of said housing halves for engagement by the hooked end of a fishhook with the shank of the fishhook projecting toward a transverse end marginal edge of the other end of said one housing half, said transverse end marginal edge including a fish line receiving notch formed therein opening outwardly in the same direction in which said one housing half opens, a tab carried by one of the housing halves extending across the interface between said housing halves when the latter are closed and disposed closely adjacent the side of said notch remote from said adjacent longitudinal edges for preventing said fish line from slipping out of said notch and wedging between the interface edges of said housing halves on the side of said notch remote from said adjacent longitudinal edges of said housing halves and coacting latch means carried by the marginal portions of said housing halves remote from the hinge connection therebetween for releasably retaining said housing halves in the closed position.

5. A container and anchor for a fish line attached hook, said container defining a pair of elongated side-by-side generally mirror image housing halves joined together along adjacent marginal edges for swinging between open positions opening in substantially the same direction and closed positions opening into each other and with each housing half comprising a closure for the other housing half, anchor means carried within one end of one of said housing halves for engagement by the hooked end of a fishhook with the shank of the fishhook projecting toward a marginal edge of the other end of said one housing half, said marginal edge including a fish line receiving notch formed therein opening outwardly in the same direction in which said one housing half opens, coacting latch means carried by the marginal portions of said housing halves remote from the hinge connection therebetween for releasably retaining said housing halves in the closed position, said one end of said housing halves each including endwise outwardly projecting tabs which are registered with each other when said housing halves are in the closed position and which include laterally opening keyhole-shaped recesses formed therein adapted to receive a marginal portion of a fishing rod line eye therein.

* * * * *